May 4, 1926.

C. A. A. RAND 1,583,008

SEED DISPENSING MECHANISM

Filed August 9, 1924   3 Sheets-Sheet 1

Inventor
Charles A. A. Rand,
By
Atty.

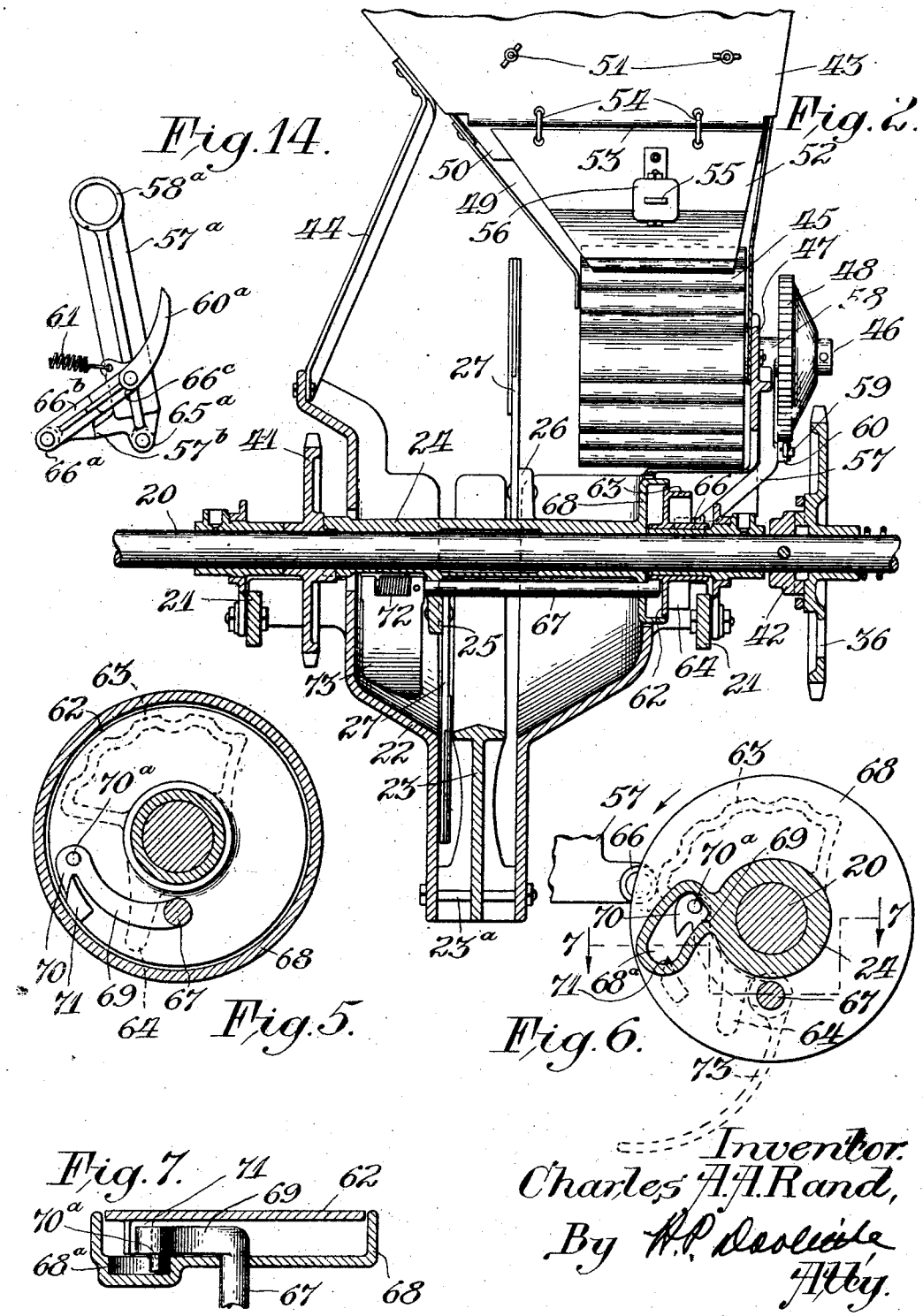

May 4, 1926.  
C. A. A. RAND  
1,583,008  
SEED DISPENSING MECHANISM  
Filed August 9, 1924  3 Sheets-Sheet 3
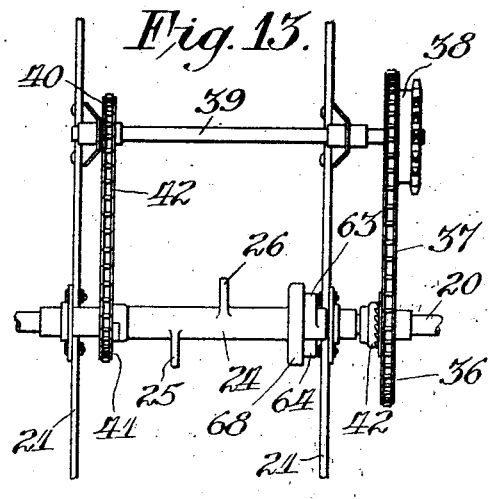
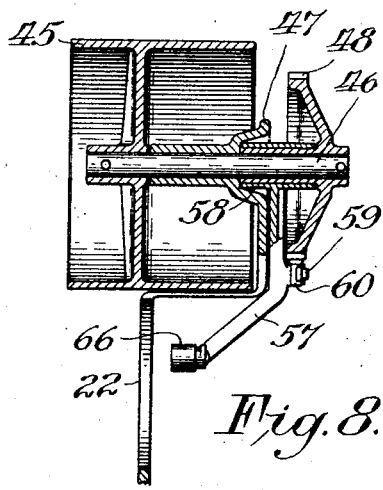
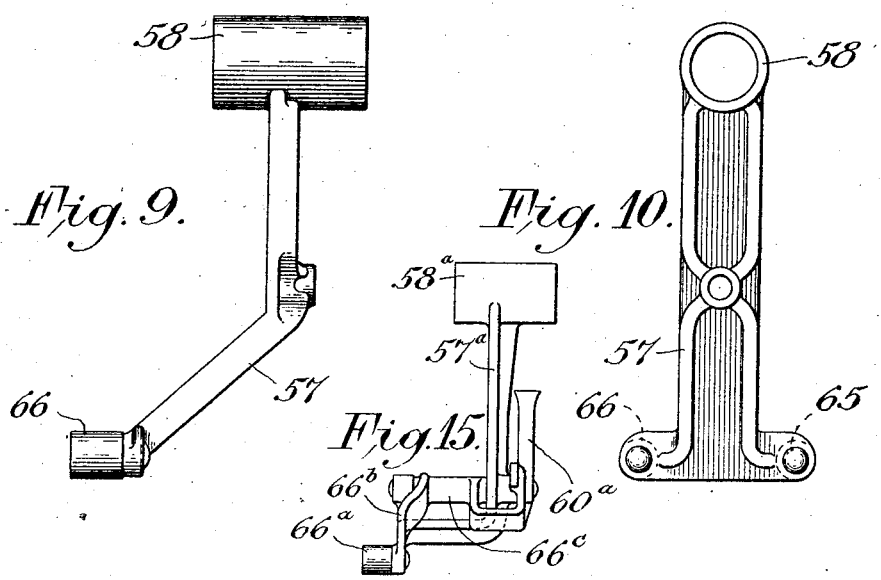
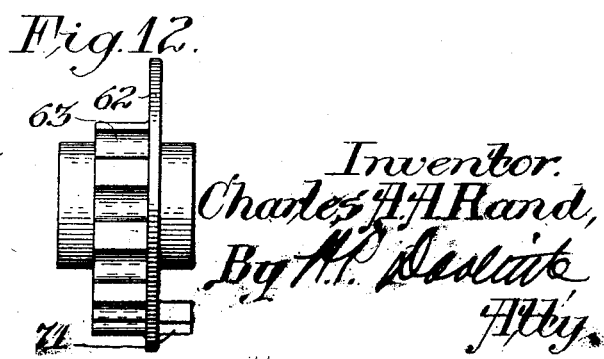

Patented May 4, 1926.

1,583,008

UNITED STATES PATENT OFFICE.

CHARLES A. A. RAND, OF CHICAGO, ILLINOIS, ASSIGNOR TO INTERNATIONAL HARVESTER COMPANY, OF CHICAGO, ILLINOIS, A CORPORATION OF NEW JERSEY.

SEED-DISPENSING MECHANISM.

Application filed August 9, 1924. Serial No. 731,067.

*To all whom it may concern:*

Be it known that I, CHARLES A. A. RAND, a citizen of the United States, residing at Chicago, in the county of Cook and State of Illinois, have invented certain new and useful Improvements in Seed-Dispensing Mechanism, of which the following is a full, clear, and exact specification.

This invention relates to seed dispensing mechanism for planters and is more particularly directed to improvements of mechanism of that type intended for use on potato planters.

The objects of the invention are to provide accurate and simple mechanism for discharging seed potatoes from a hopper and delivering them one by one to the planting tools and to embody in such mechanism automatically acting means for governing the discharge of potatoes from the hopper to prevent overloading or flooding of the magazine supplying the delivering means or pickers.

These main and other minor objects have been attained by providing a novel form of discharging means comprising an intermittently rotated feeding roller positioned at the outlet of the hopper so as to force the seed potatoes outwardly into a receiving pan or magazine from which they are picked or lifted one by one by rotating picker arms, also by controlling the driving elements of the roller through novel mechanism including a rotating trip device which is designed to be actuated when a predetermined quantity of potatoes accumulates in the magazine, thereby causing the drive of the roller to be interrupted until such a time as the pickers will have sufficiently reduced the quantity of potatoes to allow the trip to swing back to normal position and resume the roller drive.

Accordingly, the invention resides in the organization, details of construction, and parts, or equivalents thereof, hereinafter defined and claimed.

Referring to the drawings,—

Fig. 2 is a similar cross sectional view on line 2—2 of Fig. 1;

Fig. 5 is a detail view on an enlarged scale of the clutch mechanism controlling the roller drive;

Fig. 6 is a similar view showing also the trip device;

Fig. 7 is a sectional view taken on the line 7—7 of Fig. 6;

Fig. 8 is a detail sectional view showing the feeding roller and a portion of its driving mechanism;

Figs. 9 and 10 are detail views of the rocker arm forming part of the roller driving mechanism;

Figs. 11 and 12 are detail views of the cam wheel which actuates the rocker arm;

Fig. 13 is a plan view showing the chain and sprocket gearing for transmitting the drive to the seed feeding mechanism; and Figs. 14 and 15 are views of a modified form of the rocker arm shown in Figs. 9 and 10.

Figures 1, 3, 4:
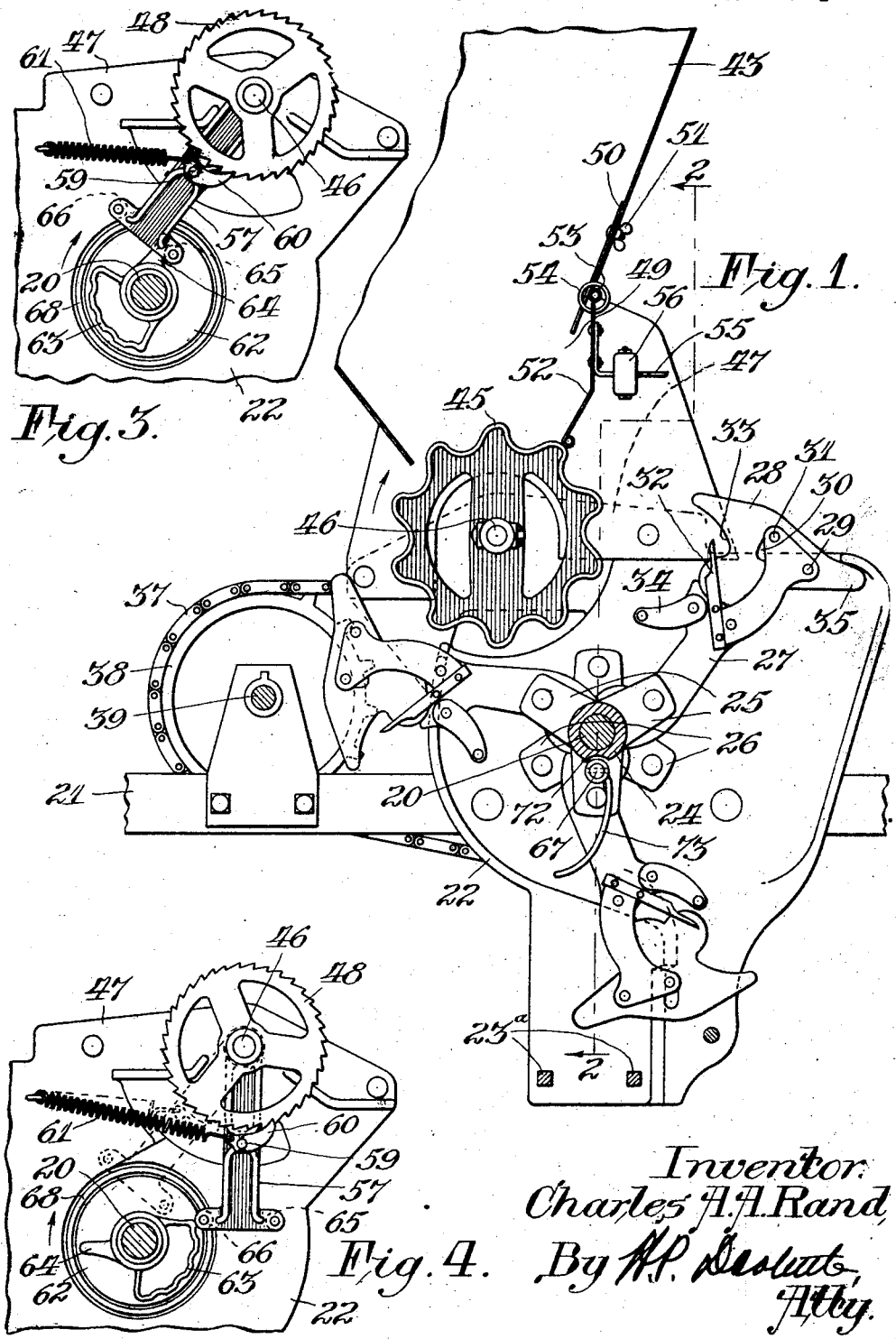
Fig. 1 is a longitudinal vertical section through the seed feeding mechanism of a potato planter embodying the invention.
Figs. 3 and 4 are detail side views of a portion of the roller driving mechanism showing the range of movement.

In the embodiment of the invention herein disclosed 20 designates the axle of a potato planter which serves as the driving element for the mechanism to be described. This axle supports the frame 21 on which is mounted the magazine 22 made up of two side sections separated by a central casting 23 bolted thereto at 23$^a$ and formed to provide openings or slots in the magazine in which the picker arms travel. On axle 20 and extending across the magazine there is journalled a sleeve 24 on which are two sets of three radially projecting lugs 25 and 26 arranged in staggered relation, as seen in Fig. 1. On these lugs there are secured the pickers 27, the outer ends of which are bifurcated to receive stripper plates 28 pivoted to the arms 27 at 29 and formed with slots 30 which cooperate with pins 31 on the arms to limit pivotal movement of the stripper plates. The arms carry fixed prongs 32 which are in cooperating relation with receiving notches 33 in the plates 28, and just below the prongs the arms carry pivoted finger pieces 34 adapted to swing inwardly to assist retention of potatoes impaled by prongs 32. It will be understood that the picker arms are positioned to travel in the slots between the sections of the magazine and that their action is to impale or pick up seed potatoes as the individual arms pass through the mass of potatoes in the bottom of the magazine lifting them up and around to the forward side of the magazine where the heel piece 35 of the stripper plate strikes an abutment on the frame causing the potatoes to be stripped from the prongs and dropped. The picker mechanism just described is of well known type and specifically not part of the present invention.

The sleeve 24 on which the pickers are mounted is driven from the axle by means of a main drive sprocket 36 journaled on the axle at one outer side of the magazine and which is connected by a sprocket chain 37 with a sprocket 38 on a projecting end of a counter shaft 39 journaled on the planter frame forward of the magazine. On the other end of counter shaft 39 there is secured a sprocket 40. The sprocket 38 preferably consists of two integrally formed sprocket wheels of different diameter and is reversible on shaft 39 so as to bring either of its sprocket teeth into alignment with driving sprocket 36. Journaled on the axle at the opposite side of the magazine from sprocket 36 is a sprocket 41 fixed to sleeve 24 and a sprocket chain 42 connects the sprockets 40 and 41, and, as the sprocket 38 is reversible as stated, the speed of drive may be changed as desired. The sprocket 36 is provided on its inner side with ratchet teeth and is laterally shiftable on the axle 20 to bring it into and out of engagement with the clutch disk 42 fixed on the axle. By this arrangement of the drive, it will be evident that when sprocket wheel 36 is engaged with collar 42 the sleeve 24 will be driven in a counter-clockwise direction through counter shaft 39 and sprocket 41, causing the picker arms to be correspondingly actuated.

Mounted on the frame above one forward corner of the magazine 22 there is a hopper 43 which is braced by a supporting bar 44, as shown in Fig. 2, and has a bottom opening so positioned as to be at one side of the picked arms. The lower portion of the hopper opening is closed by a transversely extending, fluted feed roller 45 fixed on a shaft 46 journaled in an upward extension 47 of one side of the magazine, and which has a ratchet wheel 48 on one end that projects on the outside of the extension 47. The rear wall of the hopper at a point just above the roller is provided with an outlet 49, the area of which may be varied by means of an adjustable plate 50 held in position by clamp screws 51. The outlet 50 is normally closed by a swinging gate 52 hinged at 53 at the upper edge of the outlet as by means of the suspension rings 54, and on its outer face the gate 53 has secured to it an arm 55 carrying an adjustable weight 56 by which the resistance of the gate to outward swing may be regulated. It will be obvious that rotation of the fluted feed roller in the direction of the outlet will force the seed potatoes past the gate 52 and permit them to drop into the magazine 22.

For driving the fluted roller there is provided a rocker arm 57 having a bearing sleeve 58 on its upper end which is journaled on shaft 46 between the roller 45 and ratchet wheel 48 (Fig. 8). At about its middle the rocker arm 57 is provided with a laterally extending pin 59 at a point adjacent the periphery of ratchet wheel 48. On this pin there is mounted a pawl 60 which is held in engagement with the teeth of the ratchet wheel by means of a tension spring 61 connected to the tail of the pawl and to a fixed point on the frame (Figs. 3 and 4), this spring tending also to swing the rocker arm towards the left. The lower end of the rocker arm extends inwardly to a point just above the axle 20 where there is journaled a cam wheel 62. The outer face of this cam wheel is formed with a cam surface or flange 63 which extends through approximately an angle of 90 degrees and is preferably formed with a series of indentations or seats for a purpose to be described.

The wheel 62 is also provided at a point spaced a predetermined distance from one end of the cam flange 63 with a radial projection or flange 64, and the lower end of the rocker arm 57 carries spaced rollers 65 and 66 which are positioned to be engaged by the flanges 63 and 64, respectively, the flanges 63 and 64 being spaced to correspond with the distance between the rollers 65 and 66 and so positioned that flange 64 will engage roller 65 (Fig. 3), swinging the rocker arm so that the roller 66 becomes engaged with the flange 63 on which it rides during a quarter of a revolution of the cam wheel 62. By this arrangement it will be seen that an intermittent drive will be given the ratchet wheel 48 and roller 45 so long as wheel 62 is driven, the spring 61 serving to return the rocker arm 57 after the roller 66 is released from flange 63.

In Figs. 14 and 15 there is shown an alternative form of rocker arm 57$^a$ having the sleeve 58$^a$ as in the first form but which differs in having one of the rollers 66$^a$ yieldably carried on the arm to avoid bending should the end of the flange or cam 63 contact with the roller in a radial line. In this modified form the lower end of arm 57$^a$ is bent inwardly at right angles and carries the fixed roller 65$^a$ on its end. Roller 66$^a$ is carried on a swinging arm 66$^b$ formed integrally with a sleeve 66$^c$ journaled on a short shaft just above the inwardly bent portion of arm 57$^a$ (Fig. 15). In this form the pawl 60$^a$ is integral with sleeve 66$^c$ also and the spring 61 therefore serves to normally retain roller 66ª in position against the abutment 57ᵇ.

As means for automatically controlling the drive of the fluted roller 45 to maintain a proper supply of seed potatoes in the magazine, the sleeve 24 has journaled thereon within the magazine a trip shaft 67 (Fig. 2), the outer end of which projects through an opening in a bell-shaped end 68 on the sleeve 24 occupying an opening in the side of the magazine. Within the bell-shaped portion 68 of sleeve 24 the end of shaft 67 has fixed thereon a radially extending dog 69 provided with a ratchet head 70 adapted to engage a lug 71 secured adjacent the periphery of wheel 62 on the opposite face from that having the flanges 63 and 64. The swing of dog 69 is limited by a pin 70ª working in slot 68ª of bell 68. A torsion spring 72 (Fig. 2) tends to rotate the shaft 67 in a direction to maintain the ratchet head 70 in engagement with the lug 71, this arrangement providing a clutch mechanism by which the cam wheel 62 will be constantly driven and the fluted roller 45 be given intermittent actuation so long as the dog 69 remains connected to lug 71.

To automatically control the trip shaft 67, its inner end has secured thereto a trip arm or flipper 73 which is preferably curved, as shown in Figs. 1 and 6, and positioned to sweep through the magazine at a predetermined distance from the bottom thereof as the sleeve 24 is rotated. When a predetermined quantity of seed potatoes has accumulated in the magazine the trip arm 73 will ride over them and be pushed aside causing shaft 67 to be rocked in a clockwise direction thereby moving the dog 69 away from lug 71 and finally releasing the cam wheel 62, as shown in Fig. 6. When the quantity of potatoes in the magazine has been sufficiently reduced through the action of the pickers, shaft 67 and trip 73 will return to normal position through the action of spring 72, and the lug 71 will again be engaged by the ratchet head of dog 69 and drive of the fluted roller be resumed.

The position of the cam flange 63 in relation to the dog 69 and trip arm 73 is such (Fig. 6) that actuation of the shaft 67 by potatoes in the hopper will always occur while roller 66 is at some point on the cam flange 63, and the roller 66 will, therefore, become seated in one of the indentations on that flange and hold the cam wheel 62 against accidental rotation while the drive is idle.

From the foregoing description it will be clear that when the planter is drawn forward rotation of the axle will transmit corresponding movement to the sleeve 24 which in turn will transmit intermittent rotary movement to the fluted roller 45 through the clutch mechanism constituted by the rock shaft 67, dog 69 and lug 71 on wheel 62 and that through action of the trip arm 73 an over supply of seed potatoes in the magazine will be prevented, as accumulation of a predetermined amount will cause temporary interruption of the rotation of the feed roller.

The construction above disclosed constitutes a preferred embodiment of the invention and provides a simple and efficient mechanism for the purpose set forth, but it will be understood that variations in the structure may be made without departure from the gist of the invention as defined in the following claims.

What is claimed is:

1. Feeding mechanism for potato planters comprising the combination of a hopper having an outlet, a rotary discharging device adjacent the outlet, a magazine below said device, and mechanism for imparting step by step rotation to the discharging device comprising a drive shaft extending into the magazine, a pawl and ratchet drive connected to the discharging device including a rock arm actuated by a cam normally rotatable with the drive shaft, and means for interrupting rotation of the cam when a predetermined quantity of seed accumulates in the magazine comprising a trip arm journaled on the drive shaft within the magazine and having a connection with said cam releasable upon contact of said trip arm with seed in the magazine.

2. Feeding mechanism for potato planters comprising the combination of a hopper having an outlet, a rotary discharging device adjacent the outlet, a magazine below said device, mechanism, including a drive shaft extending into the magazine, for imparting rotation to the discharging device, and a clutch normally transmitting motion from the drive shaft to the discharging device including a trip carried by the drive shaft within the magazine and adapted to release the clutch upon contact with material in the magazine.

3. Feeding mechanism for potato planters comprising the combination of a hopper having an outlet, a discharging device adjacent the outlet, a magazine below said outlet, mechanism, including a drive shaft extending into the magazine, for imparting movement to the discharging device, a releasable driving connection between said shaft and the discharging device, and a control device for the driving connection comprising a trip carried by the drive shaft within the hopper and adapted to release said connection upon contact with material in the hopper.

4. Feeding mechanism for potato planters comprising the combination of a hopper having a side outlet, a feed roller closing the bottom of the hopper and forming the lower boundary of the outlet, a yielding and swinging gate acting as a retaining member and loosely hung in the outlet, and means for rotating the feed roller in the direction of the outlet whereby seed potatoes are forced past the retaining member and discharged.

5. Feeding mechanism for potato planters comprising the combination of a hopper having a side outlet, a longitudinally fluted feed roller closing the bottom of the hopper and forming the lower boundary of the outlet, a yielding closure loosely hung in the outlet and having a portion extending substantially radially relative to said roller, and means for imparting step by step rotation to the feed roller in the direction of the outlet whereby seed potatoes are forced past the closure and discharged.

6. Mechanism of the class described comprising the combination of a hopper, mechanically actuated means for gradually discharging the contents of the hopper, a magazine positioned to receive said contents as discharged, a rotatable dispensing mechanism in said magazine, and controlling means for the mechanically actuated hopper discharging means including an element located in the magazine so as to be carried around with said dispensing mechanism and carrying a trip device to be actuated by contact with material in the magazine for suspending operation of the hopper discharging means.

7. Mechanism of the class described comprising the combination of a hopper, mechanically actuated means for gradually discharging the contents of the hopper, a magazine positioned to receive said contents as discharged, and controlling means positively rotated so as to move through the magazine actuated by contact with a predetermined quantity of matter in the magazine for suspending actuation of the hopper discharging means.

8. A feeding mechanism comprising a hopper having an outlet, a discharging device adjacent the outlet for controlling the flow of material from the hopper, a magazine receiving material from said hopper, driving mechanism for operating the discharging device, control means associated with said driving mechanism for causing the driving mechanism to become inoperative when the magazine becomes filled to a desired degree, said driving mechanism including parts so associated as to be retained at rest while the normal operation of the driving mechanism is interrupted.

In testimony whereof I affix my signature.

CHARLES A. A. RAND.